United States Patent
Liu et al.

(10) Patent No.: US 12,294,974 B2
(45) Date of Patent: May 6, 2025

(54) PAGING FOR MOBILE-TERMINATED SMALL DATA RECEPTION IN IDLE AND/OR INACTIVE MODE

(71) Applicant: QUALCOMM Incorporated, San Diego, CA (US)

(72) Inventors: Huichun Liu, Beijing (CN); Gavin Bernard Horn, La Jolla, CA (US); Miguel Griot, La Jolla, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/597,772

(22) PCT Filed: Aug. 20, 2019

(86) PCT No.: PCT/CN2019/101498
§ 371 (c)(1),
(2) Date: Jan. 21, 2022

(87) PCT Pub. No.: WO2021/031103
PCT Pub. Date: Feb. 25, 2021

(65) Prior Publication Data
US 2022/0264517 A1    Aug. 18, 2022

(51) Int. Cl.
*H04W 68/00*      (2009.01)
*H04W 74/08*      (2024.01)
(Continued)

(52) U.S. Cl.
CPC ..... *H04W 68/005* (2013.01); *H04W 74/0841* (2013.01); *H04W 76/19* (2018.02); *H04W 76/20* (2018.02); *H04W 76/30* (2018.02)

(58) Field of Classification Search
None
See application file for complete search history.

(56) References Cited

U.S. PATENT DOCUMENTS

| 10,299,244 B2 | 5/2019 | Griot et al. |
| 2016/0374048 A1 | 12/2016 | Griot et al. |

(Continued)

FOREIGN PATENT DOCUMENTS

| CN | 1719934 A | 1/2006 |
| CN | 105637779 A | 6/2016 |

(Continued)

OTHER PUBLICATIONS

International Search Report and Written Opinion—PCT/CN2019/101498—ISA/EPO—Apr. 24, 2020.

(Continued)

*Primary Examiner* — Hong Shao
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive, from a base station (BS), a paging communication while the UE is in an inactive mode or an idle mode. The UE may transmit, to the BS and based at least in part on receiving the paging communication, a first communication as part of a random access channel (RACH) procedure. The UE may receive, from the BS and based at least in part on transmitting the first communication, a second communication that includes mobile-terminated downlink data, an indication of an uplink resource, and a radio resource control (RRC) release message. The RRC release message may cause the UE to remain in the inactive mode or the idle mode while receiving the mobile-terminated downlink data. The UE may transmit mobile-originated uplink data using the uplink resource. Numerous other aspects are provided.

35 Claims, 7 Drawing Sheets

(51) Int. Cl.
*H04W 74/0833* (2024.01)
*H04W 76/19* (2018.01)
*H04W 76/20* (2018.01)
*H04W 76/30* (2018.01)

(56) References Cited

U.S. PATENT DOCUMENTS

| | | | |
|---|---|---|---|
| 2018/0139671 A1 | 5/2018 | Velev et al. | |
| 2022/0400507 A1* | 12/2022 | Shi | H04W 68/005 |
| 2023/0007623 A1* | 1/2023 | Da Silva | H04W 24/08 |

FOREIGN PATENT DOCUMENTS

| | | | |
|---|---|---|---|
| CN | 105900504 A | | 8/2016 |
| CN | 107431880 A | | 12/2017 |
| WO | WO-2016204985 | | 12/2016 |
| WO | 2018174642 A1 | | 9/2018 |
| WO | WO-2019031427 A1 | | 2/2019 |

OTHER PUBLICATIONS

"3rd Generation Partnership Project; Technical Specification Group Radio Access Network, Evolved Universal Terrestrial Radio Access (E-UTRA) and Evolved Universal Terrestrial Radio Access Network (E-UTRAN), Overall Description; Stage 2 (Release 15)", 3GPP TS 36.300, 3rd Generation Partnership Project, Mobile Competence Centre, 650, Route Des Lucioles, F-06921 Sophia-Anti Polis Cedex, France, vol. RAN WG2, No. V15.6.0, Jun. 29, 2019, pp. 1-365, XP051754468, p. 117-p. 130, Clauses 7.3b-7.3b.3.

"3rd Generation Partnership Project, Technical Specification Group Radio Access Network, Evolved Universal Terrestrial Radio Access (E-UTRA), Medium Access Control (MAC) Protocol Specification (Release 15)", 3GPP TS 36.321, 3rd Generation Partnership Project, Mobile Competence Centre, 650, Route Des Lucioles, F-06921, Sophia-Antipolis Cedex, France, vol. RAN WG2, No. V15.6.0, Jun. 27, 2019, XP051754436, pp. 1-133, section 1, 3, and 5.1, paragraph [5.1.1]-paragraph [5.4.3], Clauses 5.1-5.1.6.

Qualcomm Incorporated (Email Discussion Rapporteur) : "Email Discussion Report on [106#61] D-PUR Request, (re)configuration and Release Mechanism", R2-1909841, 3GPP TSG-RAN WG2 Meeting #107, Report_[106#61]_PUR Request_(RE) Config_Release_V3, 3rd Generation Partnership Project, Mobile Competence Centre, 650, Route Des Lucioles, F-06921 Sophia-Antipolis Cedex, vol. RAN WG2, No. Prague, Czechia, 20190826-20190830 Aug. 16, 2019, XP051767633, 52 Pages, Discussions relating to Question 3 (Q3) and Question 8 (Q8).

Qualcomm Incorporated: "(Re)configuration and Release of Pur," 3GPP Draft, 3GPP TSG-RAN WG2 Meeting #106, R2-1906445, PUR (RE)Config, 3rd Generation Partnership Project (3GPP), Mobile Competence Centre, 650, Route Des Lucioles, F-06921, Sophia-Antipolis Cedex, France, vol. RAN WG2, No. Reno, Nevada USA; 20190513-20190517, May 13, 2019 (May 13, 2019), XP051729910, 7 pages, paragraph [03 .1], section 3.1.

Supplementary European Search Report—EP19942211—Search Authority—BERLN—Apr. 6, 2023.

* cited by examiner

PAGING FOR MOBILE-TERMINATED SMALL DATA RECEPTION IN IDLE AND/OR INACTIVE MODE

CROSS-REFERENCE TO RELATED APPLICATION

This application is a 371 national stage of PCT Application No. PCT/CN2019/101498 filed on Aug. 20, 2019, entitled "PAGING FOR MOBILE-TERMINATED SMALL DATA RECEPTION IN IDLE AND/OR INACTIVE MODE," which is hereby expressly incorporated by reference herein.

FIELD OF THE DISCLOSURE

Aspects of the present disclosure generally relate to wireless communication and to techniques and apparatuses for paging for mobile-terminated small data reception in idle and/or inactive mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), a paging communication while the UE is in an inactive mode or an idle mode; transmitting, to the BS and based at least in part on receiving the paging communication, a first communication as part of a random access channel (RACH) procedure; receiving, from the BS and based at least in part on transmitting the first communication, a second communication that includes mobile-terminated downlink data, an indication of an uplink resource, and a radio resource control (RRC) release message that causes the UE to remain in the inactive mode or the idle mode while receiving the mobile-terminated downlink data; and transmitting, to the BS and while in the inactive mode or the idle mode, mobile-originated uplink data using the uplink resource.

In some aspects, a method of wireless communication, performed by a BS, may include transmitting, to a UE, a paging communication while the UE is in an inactive mode or an idle mode; receiving, from the UE and based at least in part on transmitting the paging communication, a first communication as part of a RACH procedure; transmitting, to the UE and based at least in part on transmitting the first communication, a second communication that includes mobile-terminated downlink data, an uplink resource that the UE is to use to transmit mobile-originated uplink data while in the inactive mode or the idle mode, and an RRC release message that causes the UE receive the mobile-terminated downlink data while in the inactive mode or the idle mode; and receiving, from the UE and in the uplink resource, mobile-originated uplink data, wherein the UE is to transmit the mobile-originated uplink data while in the inactive mode or the idle mode.

In some aspects, a UE for wireless communication may include memory and one or more processors coupled to the memory. The memory and the one or more processors may be configured to receive, from a BS, a paging communication while the UE is in an inactive mode or an idle mode; transmit, to the BS and based at least in part on receiving the paging communication, a first communication as part of a RACH procedure; receive, from the BS and based at least in part on transmitting the first communication, a second communication that includes mobile-terminated downlink data, an indication of an uplink resource, and an RRC release message that causes the UE to remain in the inactive mode or the idle mode while receiving the mobile-terminated downlink data; and transmit, to the BS and while in the inactive mode or the idle mode, mobile-originated uplink data using the uplink resource.

In some aspects, a BS for wireless communication may include memory and one or more processors coupled to the memory. The memory and the one or more processors may be configured to transmit, to a UE, a paging communication while the UE is in an inactive mode or an idle mode; receive, from the UE and based at least in part on transmitting the paging communication, a first communication as part of a RACH procedure; transmit, to the UE and based at least in part on transmitting the first communication, a second communication that includes mobile-terminated downlink data, an uplink resource that the UE is to use to transmit mobile-originated uplink data while in the inactive mode or the idle mode, and an RRC release message that causes the UE receive the mobile-terminated downlink data while in the inactive mode or the idle mode; and receive, from the UE and in the uplink resource, mobile-originated uplink data, wherein the UE is to transmit the mobile-originated uplink data while in the inactive mode or the idle mode.

In some aspects, a non-transitory computer-readable medium may store one or more instructions for wireless communication. The one or more instructions, when executed by one or more processors of a UE, may cause the one or more processors to: receive, from a BS, a paging communication while the UE is in an inactive mode or an idle mode; transmit, to the BS and based at least in part on receiving the paging communication, a first communication as part of a RACH procedure; receive, from the BS and based at least in part on transmitting the first communication, a second communication that includes mobile-terminated downlink data, an indication of an uplink resource, and a RRC release message that causes the UE to remain in the inactive mode or the idle mode while receiving the mobile-terminated downlink data; and transmit, to the BS and while in the inactive mode or the idle mode, mobile-originated uplink data using the uplink resource.

In some aspects, a non-transitory computer-readable medium may store one or more instructions for wireless communication. The one or more instructions, when executed by one or more processors of a BS, may cause the one or more processors to: transmit, to a UE, a paging communication while the UE is in an inactive mode or an idle mode; receive, from the UE and based at least in part on transmitting the paging communication, a first communication as part of a RACH procedure; transmit, to the UE and based at least in part on transmitting the first communication, a second communication that includes mobile-terminated downlink data, an uplink resource that the UE is to use to transmit mobile-originated uplink data while in the inactive mode or the idle mode, and an RRC release message that causes the UE receive the mobile-terminated downlink data while in the inactive mode or the idle mode; and receive, from the UE and in the uplink resource, mobile-originated uplink data, wherein the UE is to transmit the mobile-originated uplink data while in the inactive mode or the idle mode.

In some aspects, an apparatus for wireless communication may include means for receiving, from a BS, a paging communication while the apparatus is in an inactive mode or an idle mode; means for transmitting, to the BS and based at least in part on receiving the paging communication, a first communication as part of a RACH procedure; means for receiving, from the BS and based at least in part on transmitting the first communication, a second communication that includes mobile-terminated downlink data, an indication of an uplink resource, and an RRC release message that causes the apparatus to remain in the inactive mode or the idle mode while receiving the mobile-terminated downlink data; and means for transmitting, to the BS and while in the inactive mode or the idle mode, mobile-originated uplink data using the uplink resource.

In some aspects, an apparatus for wireless communication may include means for transmitting, to a UE, a paging communication while the UE is in an inactive mode or an idle mode; means for receiving, from the UE and based at least in part on transmitting the paging communication, a first communication as part of a RACH procedure; means for transmitting, to the UE and based at least in part on transmitting the first communication, a second communication that includes mobile-terminated downlink data, an uplink resource that the UE is to use to transmit mobile-originated uplink data while in the inactive mode or the idle mode, and an RRC release message that causes the UE receive the mobile-terminated downlink data while in the inactive mode or the idle mode; and means for receiving, from the UE and in the uplink resource, mobile-originated uplink data, wherein the UE is to transmit the mobile-originated uplink data while in the inactive mode or the idle mode.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
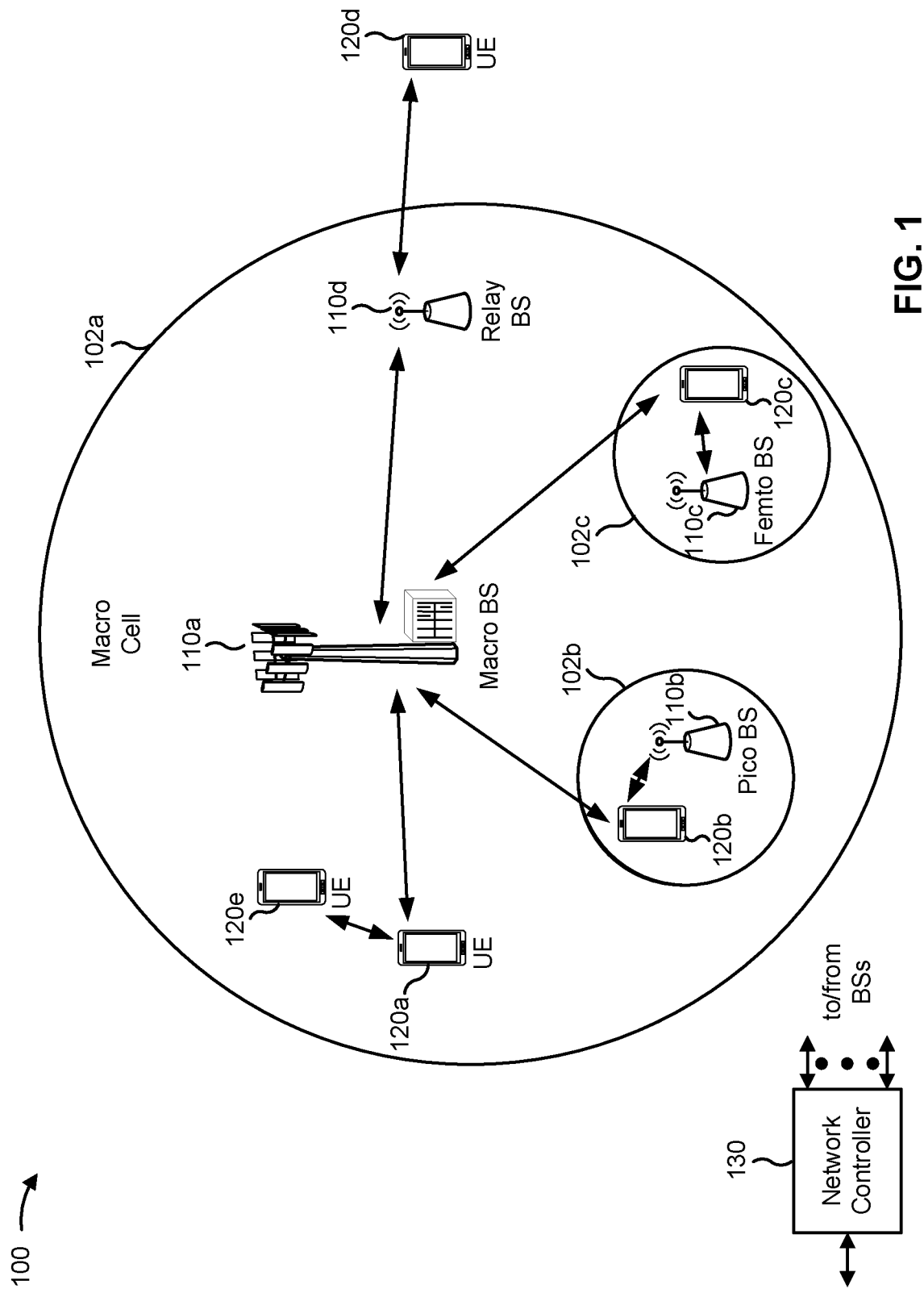
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, wireless network 100 may include one or more network controllers 130. For example, wireless network 100 may include a network controller 130 that implements an access and mobility management function (AMF) device, a network controller 130 that implements a user plane function (UPF) device, and/or the like. In some aspects, the AMF device and/or UPF device may be included in a core network of wireless network 100 (e.g., a 5G/NR core network, which may be referred to as a next generation (NG) Core). The AMF device may manage authentication, activation, deactivation, and/or mobility functions associated with a UE 120. The AMF device may facilitate the selection of a gateway (e.g., a serving gateway, a packet data network gateway, a UPF device, and/or the like) to serve traffic to and/or from a UE 120, may forward traffic (e.g., control plane traffic) to and from a UE 120, and/or the like. The UPF device may function as a session anchor and/or gateway for a UE 120, may forward traffic (e.g., user plane traffic, application traffic, and/or the like) between a UE 120 and an application server, a packet data network, a public network, another type of network, another UE 120, and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
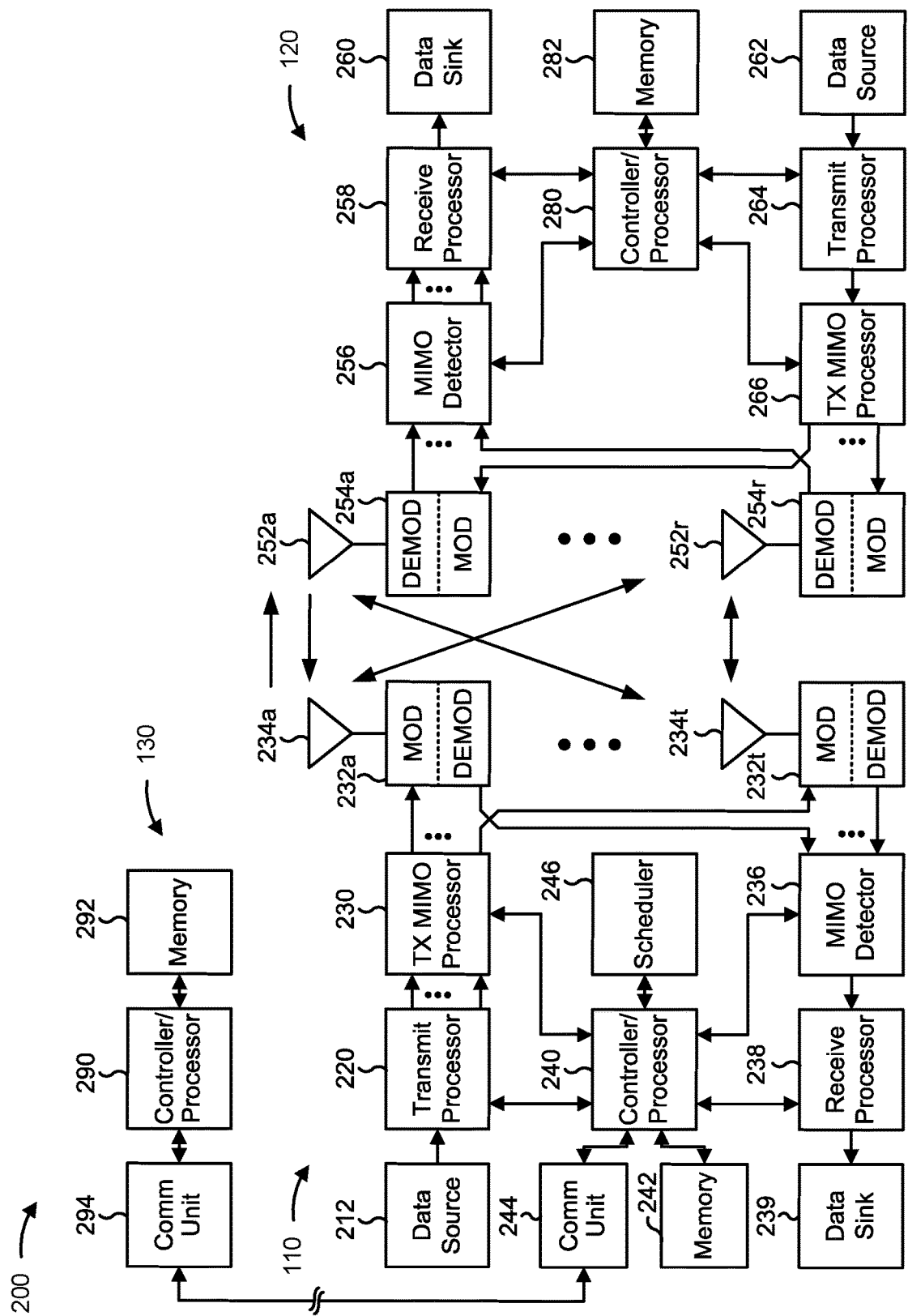
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with mobile-terminated small data reception in idle and/or inactive mode, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving, from a BS 110, a paging communication while the UE 120 is in an inactive mode or an idle mode, means for transmitting, to the BS 110 and based at least in part on receiving the paging communication, a first communication as part of a random access channel (RACH) procedure, means for receiving, from the BS 110 and based at least in part on transmitting the first communication, a second communication that includes mobile-terminated downlink data, an indication of an uplink resource, and a radio resource control (RRC) release message that causes the UE 120 to remain in the inactive mode or the idle mode while receiving the mobile-terminated downlink data; and transmitting, to the BS 110 and while in the inactive mode or the idle mode, mobile-originated uplink data using the uplink resource, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for transmitting, to a UE 120, a paging communication while the UE 120 is in an inactive mode or an idle mode, means for receiving, from the UE 120 and based at least in part on transmitting the paging communication, a first communication as part of a RACH procedure, means for transmitting, to the UE 120 and based at least in part on transmitting the first communication, a second communication that includes mobile-terminated downlink data, an uplink resource that the UE 120 is to use to transmit mobile-originated uplink data while in the inactive mode or the idle mode, and an RRC release message that causes the UE 120 receive the mobile-terminated downlink data while in the inactive mode or the idle mode, means for receiving, from the UE 120 and in the uplink resource, mobile-originated uplink data, wherein the UE 120 is to transmit the mobile-originated uplink data while in the inactive mode or the idle mode, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE (e.g., UE 120) may support various communication modes, such as a connected mode, an inactive mode, an idle mode, and/or other communication modes. A UE operating in the connected mode (e.g., an RRC connected mode) may be active and communicatively connected (e.g., RRC connected) with a BS (e.g., BS 110). The UE may transition from the connected mode to the inactive mode and/or idle mode based at least in part on various commands and/or communications received from the BS. For example, the UE may transition from the connected mode to the idle mode based at least in part on receiving an RRC release message (e.g., an RRCRelease communication). In this case, the UE may release the connection with the BS and transition to the idle mode, in which the UE may disable and/or deactivate one or more components of the UE, one or more component carriers and/or sub carriers, and/or other components and/or functionalities for purposes of power saving and battery life extension of the UE.

As another example, the UE may transition from the connected mode to the inactive mode based at least in part on receiving an RRC release message (e.g., an RRCRelease with suspendConfig communication). In this case, the UE, the BS, and/or a network controller (e.g., network controller 130) may store a UE context (e.g., an access stratum (AS) context, higher-layer configurations, and/or the like). This permits the UE and/or the BS to apply the stored UE context when the UE transitions from inactive mode to the connected mode with the BS in order to resume communications with the BS, which reduces latency of transitioning to inactive mode relative to transitioning to the connected mode from the idle mode.

The UE may transition from inactive mode and/or idle mode to the connected mode based at least in part on transmitting one or more communications to the BS. For example, the UE may transition from the inactive mode and/or the idle mode to the connected mode by transmitting an RRCSetupRequest communication an RRCResumeRequest communication, and/or the like to the BS. The UE may transmit the RRCSetupRequest communication or RRCResumeRequest communication as part of a RACH procedure with the BS, such as a contention-based or contention-free two-step RACH procedure, a contention-based or contention-free two-step RACH procedure, and/or the like.

In some cases, a UE may receive small amounts of downlink data (e.g., a few hundred kilobytes, up to one thousand kilobytes, and/or the like) in bursts from another UE, an application server, a network controller (e.g., a UPF device, an AMF device, and/or the like), and/or other entities. These small amounts of mobile-terminated (MT) downlink data (e.g., data that destined for the UE) may include data associated with a messaging application, location data, small multimedia files, push notifications, keep-alive packets, sensor data, and/or the like.

In some cases, an entity may transmit MT downlink data to the UE while the UE is in an idle mode or an inactive mode. In this case, the UE may transition to a connected mode by performing a RACH procedure with a BS to establish a connection with the BS, and to receive the MT downlink data from the BS while the UE is in the connected mode. However, transitioning to the connected mode in order to receive small amounts of MT downlink data may be inefficient because the consumption of networking, processing, and/or memory resources of the UE and the BS due to the signaling overhead of establishing a connection with the BS. Moreover, delaying the reception of the MT downlink data until the UE is in the connected mode may increase latency in receiving the MT downlink data and/or transmitting mobile-originated (MO) uplink data in response to the MT downlink data. In addition, if MT downlink data is transmitted to the UE in bursts, the repeated transition from the idle mode or inactive mode to the connected mode to receive a small amount of MT downlink data may reduce or negate the power saving benefits of operating in the idle mode or inactive mode.

Some aspects described herein provide techniques and apparatuses for mobile-terminated small data reception in idle mode and/or inactive mode. In some aspects, a UE, a BS, and/or other devices included in a wireless network may coordinate to permit the UE to receive small amounts of MT downlink data while in an idle mode and/or an inactive mode. In some aspects, the BS may transmit a paging communication to the UE while the UE is in the idle mode or the inactive mode. The paging communication may indicate, to the UE, that MT downlink data is to be transmitted to the UE. The UE may transmit, to the BS, a first communication as part of a RACH procedure with the BS. The BS may transmit a second communication to the UE based at least in part on receiving the first communication. The second communication may include the MT downlink data in an RRC release message. The UE may receive the MT downlink data while in the idle mode or the inactive mode, and the RRC release message may cause the UE to terminate the RACH procedure and to remain in the idle mode or the inactive mode. In some aspects, the second communication may also include an indication of an uplink resource, which the UE may use to transmit MO uplink data while in the idle mode or the inactive mode.

In this way, the UE may receive the MT downlink data while in the idle mode or the inactive mode, and without transitioning from the idle mode or the inactive mode to a connected mode. This decreases the signaling overhead that is needed to transmit small amounts of MT downlink data to the UE and for the UE to transmit MO uplink data, which conserves networking, processing, and/or memory resources of the UE, the BS, and/or the other devices included in the wireless network. Moreover, this permits the UE to receive the MT downlink data and transmit the MO uplink data without establishing a connection (e.g., an RRC connection) with the BS, which decreases latency in receiving the MT downlink data and transmitting the MO uplink data. In addition, this reduces the quantity of repeated transitions from the idle mode or inactive mode to the connected mode to receive small amounts of MT downlink data that are transmitted in bursts, which may increase power saving of the UE.

Figure 3:
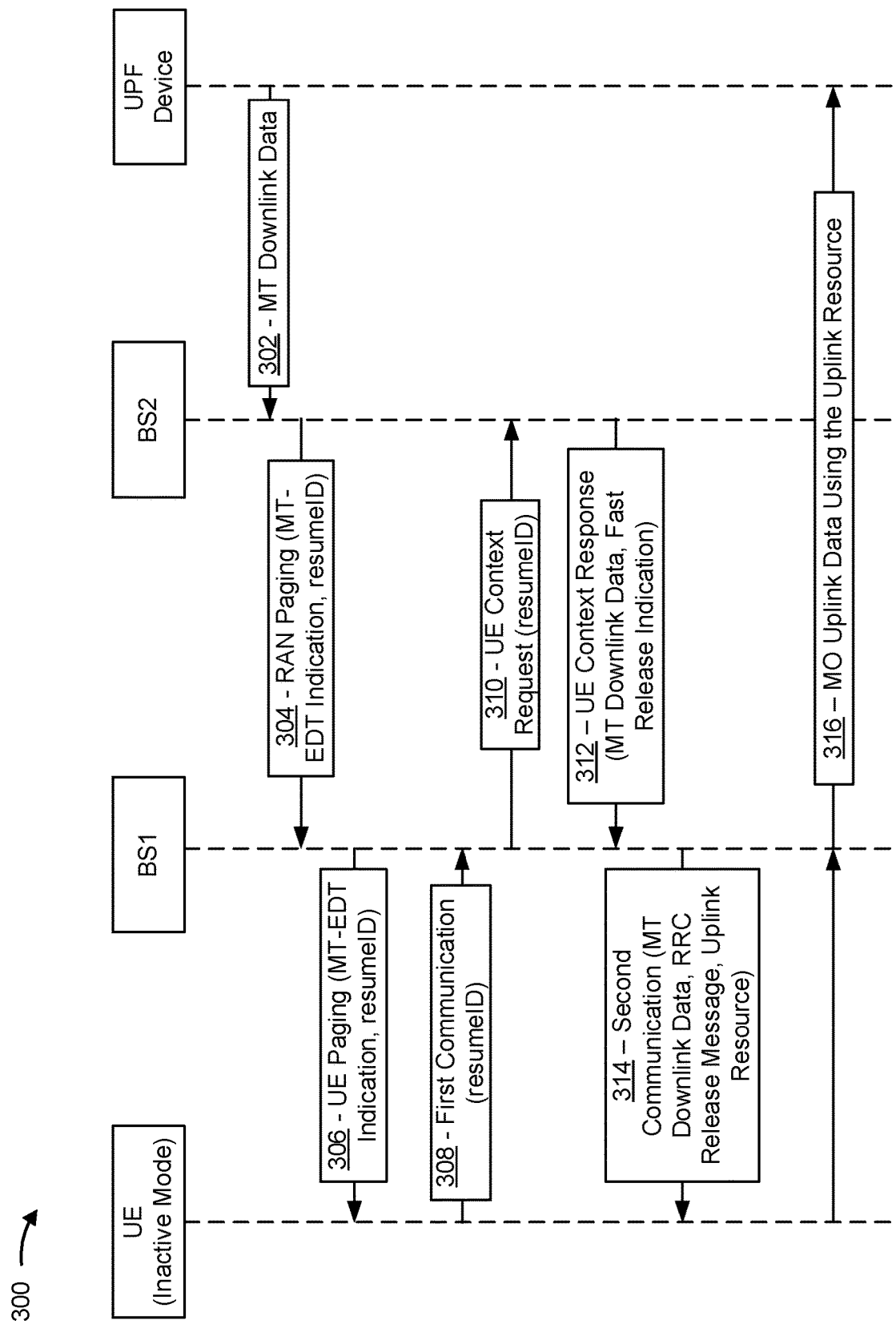
FIGS. 3-5 are diagrams illustrating an examples of mobile-terminated small data reception in idle and/or inactive mode, in accordance with various aspects of the present disclosure.

FIG. 3 is a diagram illustrating one or more examples 300 of mobile-terminated small data reception in an inactive mode, in accordance with various aspects of the present disclosure. As shown in FIG. 3, example(s) 300 may include communication between various components of a wireless network (e.g., wireless network 100), such as a UE (e.g., UE 120), a plurality of BSs (e.g., BSs 110), such as BS1 and BS2, a UPF device (e.g., network controller 130), and/or the like. In some aspects, the UE may operate in an inactive mode.

As shown in FIG. 3, and by reference number 302, the UPF device may receive MT downlink data that is destined for the UE and may transmit the MT downlink data to BS2. The MT downlink data may include a small amount of data, such as data associated with a messaging application, location data, small multimedia files, push notifications, keep-alive packets, sensor data, and/or the like that originated from an application server, another UE, a BS, a network controller, and/or another device included in the wireless network or connected to another network.

In some aspects, the UPF device may transmit the MT downlink data to BS2 based at least in part on determining that BS2 is an anchor BS for the UE (e.g., a BS to which the UE was last communicatively connected prior to transitioning to the inactive mode).

As further shown in FIG. 3, and by reference number 304, BS2 may transmit, to BS1, a radio access network (RAN) paging communication based at least in part on receiving the MT downlink data. In some aspects, BS2 may transmit the RAN paging communication to BS1 based at least in part on determining that the UE is located in a cell of BS1, which may occur, for example, due to mobility of the UE after transitioning to the inactive mode. In some aspects, BS2 may transmit the RAN paging communication over a backhaul interface, such as an Xn interface and/or another type of backhaul interface.

In some aspects, the RAN paging communication may include a MT early data transmission (MT-EDT) indication and a resume identifier (resumeID) or another type of UE identifier associated with the UE. The MT-EDT indication may be an indication that the MT downlink data is being stored or buffered at BS2 and is to be transmitted to the UE (e.g., the UE associated with the resumeID identified in the paging communication). The resumeID associated with the UE may be a UE identifier that BS2 assigned to the UE for purposes of storing and reactivating a UE context associated with the UE. The UE may provide the resumeID to a BS (e.g., BS1), and the BS may retrieve the UE context associated with the UE so that the UE may transition from the inactive mode to a connected mode using the UE context.

As further shown in FIG. 3, and by reference number 306, BS1 may transmit a UE paging communication to the UE based at least in part on receiving the RAN paging communication that identifies the MT-EDT indication and the resumeID associated with the UE. In some aspects, the UE paging communication may include the MT-EDT indication and the resumeID associated with the UE.

The UE may receive the UE paging communication (e.g., while in the inactive mode), and may descramble and/or decode the UE paging communication to determine whether the UE paging communication is directed to the UE. For example, the UE may determine that the UE paging communication is directed to the UE based at least in part on the UE paging communication identifying the resumeID associated with the UE.

As further shown in FIG. 3, and by reference number 308, the UE may initiate a RACH procedure with the BS, and may transmit a first communication as part of the RACH procedure. In some aspects, the UE may transmit the first communication based at least in part on identifying the MT-EDT indication in the UE paging communication. The first communication may include an RRCResumeRequest communication or another type of RACH communication to initiate a connection with the BS.

In some aspects, the first communication may identify the resumeID of the UE. In some aspects, the first communication may further identify an authentication token associated with the UE, such as a resume message authentication code for integrity (resumeMAC-I), a short resumeMAC-I, and/or the like, that may be used to validate the authenticity of the first communication. In some aspects, the first communication may include an MT-EDT preamble, which may indicate that the first communication is a response to the MT-EDT indication.

As further shown in FIG. 3, and by reference number 310, BS1 may receive the first communication and may transmit a UE context request to BS2 based at least in part on receiving the first communication. The UE context request may be a request to retrieve the UE context, associated with the UE, that is stored at BS2. In some aspects, the UE context request may identify the resumeID associated with the UE, which BS2 may use to identify the UE context associated with the UE. In some aspects, the UE context request may also identify the authentication token associated with the UE, which BS2 may use to validate the authenticity of the first communication.

As further shown in FIG. 3, and by reference number 312, BS2 may transmit a UE context response to BS2 based at least in part on receiving the UE context request from BS1. In some aspects, BS2 may transmit the UE context request based at least in part on identifying the UE context associated with the UE (e.g., based at least in part on the resumeID identified in the UE contest request), based at least in part on validating the authentication the authenticity of the first communication (e.g., based at least in part on the authentication token identified in the UE context request), and/or the like.

In some aspects, BS2 may determine that BS2 is storing or buffering the MT downlink data that is destined for the UE. In this case, the UE context response may include the MT downlink data. Moreover, in some aspects, the UE context response may include a fast release indication. The fast release indication may be an indication, to BS1, that the UE is to remain in the inactive mode while receiving, and after receiving, the MT downlink data.

In some aspects, BS2 may determine to include the fast release indication in the UE context response message based at least in part on determining that the UE is expected to not transmit MO uplink data in response to the MT downlink data, or that the UE is expected to transmit a small amount of MO uplink data in response to the MT downlink data. In some aspects, BS2 may determine that the UE is expected to not transmit MO uplink data in response to the MT downlink data, or that the UE is expected to transmit a small amount of MO uplink data in response to the MT downlink data, based at least in part on subscription information associated with the UE (e.g., subscription information for the wireless network, subscription information for one or more services provided by the wireless network or an application server, and/or the like), based at least in part on the data type of the MT downlink data, based at least in part on a historical traffic pattern associated with the UE, based at least in part on an indication from the UPF device and/or another network controller, and/or the like.

As further shown in FIG. 3, and by reference number 314, BS1 may receive the UE context response and may transmit a second communication as part of the RACH procedure based at least in part on receiving the UE context response. The second communication may be a Msg2 communication or a Msg4 communication in a four-step RACH procedure, a MsgB communication in two-step RACH procedure, and/or the like.

In some aspects, the second communication may include the MT downlink data that is destined for the UE. Moreover, the second communication may include an RRC release message, which may cause the UE and the BS to terminate the RACH procedure such that the UE remains in the inactive mode while the UE receives MT downlink data and after receiving the MT downlink data. In this case, the UE may identify the RRC release message included in the second communication, and may terminate the RACH procedure based at least in part on identifying the RRC release message to remain in the inactive mode while receiving the MT downlink data and after receiving the MT downlink data. The RRC release message may be an RRCRelease with suspendConfig communication, which may cause the UE and/or BS1 to store the UE context of the UE.

In some aspects, the second communication may further include an indication of an uplink resource, which may include a time-domain resource (e.g., one or more OFDM symbols, one or more slots, and/or the like) and/or a frequency-domain resource (e.g., one or more subcarriers, one or more component carriers, and/or the like) in which the UE may transmit MO uplink data (e.g., which may or may not be associated with the MT downlink data) while in the inactive mode. In some aspects, the MT downlink data, the RRC release message, and the indication of the uplink resource may be multiplexed in the second communication (e.g., time division multiplexed and/or frequency division multiplexed).

As further shown in FIG. 3, and by reference number 316, the UE may transmit MO uplink data using the uplink resource identified in the second communication. In this case, the UE may transmit the MO uplink data to BS1 and while in the inactive mode, and BS1 may transmit or forward the MO uplink data to the UPF device.

In this way, the UE may receive the MT downlink data while in the inactive mode, and without transitioning from the inactive mode to a connected mode. This decreases the signaling overhead that is needed to transmit small amounts of MT downlink data to the UE and for the UE to transmit MO uplink data, which conserves networking, processing, and/or memory resources of the UE, the BS, and/or the other devices included in the wireless network. Moreover, this permits the UE to receive the MT downlink data and transmit the MO uplink data without establishing a connection (e.g., an RRC connection) with the BS, which decreases latency in receiving the MT downlink data and transmitting the MO uplink data. In addition, this reduces the quantity of repeated transitions from the inactive mode to the connected mode to receive small amounts of MT downlink data that are transmitted in bursts, which may increase power saving of the UE.

As indicated above, FIG. 3 is provided as one or more examples. Other examples may differ from what is described with respect to FIG. 3.

Figure 4:
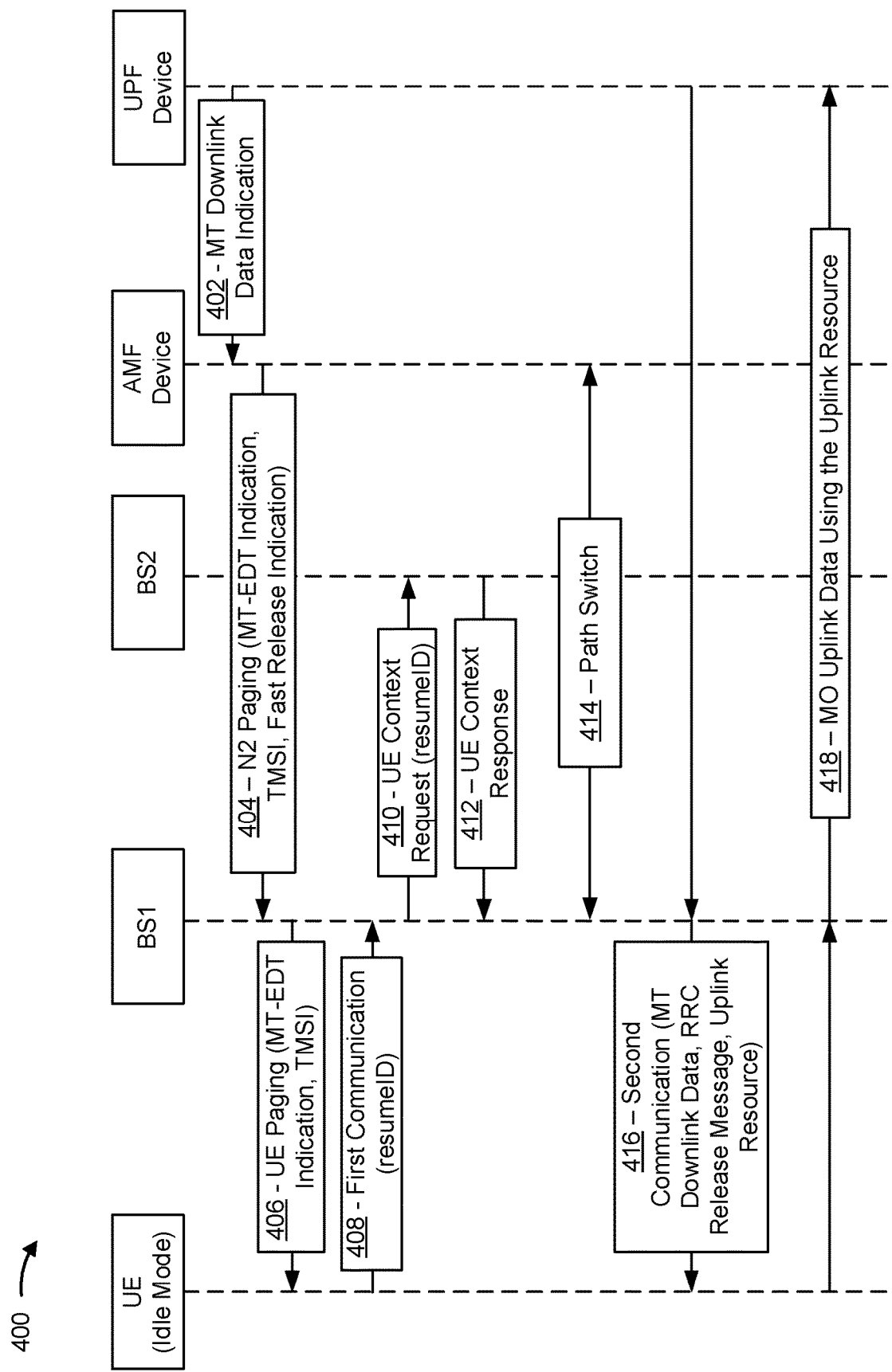

FIG. 4 is a diagram illustrating one or more examples 400 of mobile-terminated small data reception in an idle mode, in accordance with various aspects of the present disclosure. As shown in FIG. 4, example(s) 400 may include communication between various components of a wireless network (e.g., wireless network 100), such as a UE (e.g., UE 120), a plurality of BSs (e.g., BSs 110), such as BS1 and BS2, a UPF device (e.g., network controller 130), an AMF device (e.g., network controller 130), and/or the like. In some aspects, the UE may operate in an idle mode.

As shown in FIG. 4, and by reference number 402, the UPF device may receive MT downlink data that is destined for the UE and may transmit an MT downlink indication to the AMF device. The MT downlink data may include a small amount of data, such as data associated with a messaging application, location data, small multimedia files, push notifications, keep-alive packets, sensor data, and/or the like that originated from an application server, another UE, a BS, a network controller, and/or another device included in the wireless network or connected to another network.

In some aspects, the MT downlink data indication may be an indication that the UPF is storing and/or buffering MT downlink data that is destined for the UE. In some aspects, the UPF device may transmit the MT downlink data indication to the AMF device based at least in part on determining that the AMF device is associated with, and manages access and mobility for, a RAN in which BS1 is included, based at least in part on determining that the UE is located in a cell of BS1, and/or the like.

As further shown in FIG. 4, and by reference number 404, the AMF device may transmit, to BS1, an N2 paging communication based at least in part on receiving the MT downlink data indication from the UPF device. In some aspects, the AMF device may transmit the N2 paging communication to BS1 based at least in part on determining that the UE is located in the cell of BS1, which may occur, for example, due to mobility of the UE after transitioning to the idle mode. In some aspects, the N2 paging communication may be a paging communication that is transmitted over a backhaul interface, such as an N2 interface and/or another type of backhaul interface.

In some aspects, the N2 paging communication may include the MT-EDT indication, a temporary mobile subscription identifier (TMSI) (e.g., a next generation shortened TMSI (NG-S-TMSI) and/or another type of TMSI) or another type of UE identifier associated with the UE (e.g., a resumeID), and a fast release indication. The MT-EDT indication may be an indication that the MT downlink data is being stored and/or buffered at the UPF device and is to be transmitted to the UE (e.g., the UE associated with the TMSI identified in the N2 paging communication).

The TMSI associated with the UE may be a UE identifier that is assigned to the UE for purposes of paging the UE while the UE is in the idle mode. In some aspects, the AMF device may generate the TMSI and assign the TMSI to the UE. In some aspects, the AMF device may generate the TMSI based at least in part on one or more parameters associated with the AMF device and/or the UE, such as an AMF pointer, an AMY set identifier, another identifier associated with the UE, and/or the like. The UE may provide the TMSI to a BS (e.g., BS1) based at least in part on being paged by the BS (e.g., based at least in part on receiving a UE paging communication from the BS) in order to establish the identity of the UE with the BS. The resumeID associated with the UE may be a UE identifier that is assigned to the UE for purposes of storing and reactivating a UE context associated with the UE.

The fast release indication may be an indication, to BS1, that the UE is to remain in the idle mode while receiving, and after receiving, the MT downlink data. In some aspects, the AMF device may determine to include the fast release indication in the N2 paging communication based at least in part on determining that the UE is expected to not transmit MO uplink data in response to the MT downlink data, or that the UE is expected to transmit a small amount of MO uplink data in response to the MT downlink data. In some aspects, the AMF device may determine that the UE is expected to not transmit MO uplink data in response to the MT downlink data, or that the UE is expected to transmit a small amount of MO uplink data in response to the MT downlink data, based at least in part on subscription information associated with the UE (e.g., subscription information for the wireless network, subscription information for one or more services provided by the wireless network or an application server, and/or the like), based at least in part on the data type of the MT downlink data, based at least in part on a historical traffic pattern associated with the UE, based at least in part on an indication from the UPF device and/or another network controller, and/or the like.

As further shown in FIG. 4, and by reference number 406, BS1 may transmit a UE paging communication to the UE based at least in part on receiving the N2 paging communication that identifies the MT-EDT indication and the TMSI and/or resumeID associated with the UE. In some aspects, the UE paging communication may include the MT-EDT indication and the TMSI and/or resumeID associated with the UE.

The UE may receive the UE paging communication (e.g., while in the idle mode), and may descramble and/or decode the UE paging communication to determine whether the UE paging communication is directed to the UE. For example, the UE may determine that the UE paging communication is directed to the UE based at least in part on the UE paging communication identifying the TMSI and/or resumeID associated with the UE.

As further shown in FIG. 4, and by reference number 408, the UE may initiate a RACH procedure with the BS, and may transmit a first communication as part of the RACH procedure. In some aspects, the UE may transmit the first communication based at least in part on identifying the MT-EDT indication in the UE paging communication. The first communication may include an RRCResumeRequest communication, an RRCSetupRequest communication, or another type of RACH communication to initiate connection establishment with the BS.

In some aspects, the first communication may include the resumeID such that the BS may retrieve the UE context associated with the UE so that the UE may transition from the idle mode to a connected mode using the UE context. In some aspects, the first communication may identify the TMSI of the UE such that the BS may identify the UE. In some aspects, the first communication may further identify an authentication token associated with the UE, such as a resumeMAC-I, a short resumeMAC-I, and/or the like, that may be used to validate the authenticity of the first communication. In some aspects, the first communication may include an MT-EDT preamble, which may indicate that the first communication is a response to the MT-EDT indication.

As further shown in FIG. 4, and by reference number 410, BS1 may receive the first communication and may transmit a UE context request to BS2 based at least in part on receiving the first communication. In some aspects, BS1 may transmit the UE context request to BS2 based at least in part on BS2 being an anchor BS for the UE (e.g., a BS to which the UE was last communicatively connected prior to transitioning to the idle mode) and storing the UE context associated with the UE. The UE context request may be a request to retrieve the UE context stored at BS2. In some aspects, the UE context request may identify the resumeID associated with the UE, which BS2 may use to identify the UE context associated with the UE. In some aspects, the UE context request may also identify the authentication token associated with the UE, which BS2 may use to validate the authenticity of the first communication.

As further shown in FIG. 4, and by reference number 412, BS2 may transmit a UE context response to BS2 based at least in part on receiving the UE context request from BS1. In some aspects, BS2 may transmit the UE context request based at least in part on identifying the UE context associated with the UE (e.g., based at least in part on the resumeID identified in the UE contest request), based at least in part on validating the authentication the authenticity of the first communication (e.g., based at least in part on the authentication token identified in the UE context request), and/or the like.

As further shown in FIG. 4, and by reference number 414, BS1 may receive the UE context response and may jointly coordinate a path switch for the UE based at least in part on receiving the UE contest response. The path switch may include transitioning a communication path between the UE and the UPF device from being served by BS2 to being served by BS1. In this case, BS1 may forward communications between the UE and the UPF device based at least in part on the path switch.

As further shown in FIG. 4, and by reference number 416, BS1 may transmit a second communication as part of the RACH procedure based at least in part on the communication path associated with the UE being transitioned to BS1. The second communication may be a Msg2 communication or a Msg4 communication in a four-step RACH procedure, a MsgB communication in two-step RACH procedure, and/or the like.

In some aspects, the second communication may include the MT downlink data that is destined for the UE. Moreover, the second communication may include an RRC release message, which may cause the UE and the BS to terminate the RACH procedure such that the UE remains in the idle mode while the UE receives MT downlink data and after receiving the MT downlink data. In this case, the UE may identify the RRC release message included in the second communication, and may terminate the RACH procedure based at least in part on identifying the RRC release message to remain in the idle mode while receiving the MT downlink data and after receiving the MT downlink data. The RRC release message may be an RRCRelease communication, an RRCRelease with suspendConfig communication (e.g., which may cause the UE and/or BS1 to store the UE context of the UE), and/or the like.

In some aspects, the second communication may further include an indication of an uplink resource, which may include a time-domain resource (e.g., one or more OFDM symbols, one or more slots, and/or the like) and/or a frequency-domain resource (e.g., one or more subcarriers, one or more component carriers, and/or the like) in which the UE may transmit MO uplink data (e.g., which may or may not be associated with the MT downlink data) while in the idle mode. In some aspects, the MT downlink data, the RRC release message, and the indication of the uplink resource may be multiplexed in the second communication (e.g., time division multiplexed and/or frequency division multiplexed).

As further shown in FIG. 4, and by reference number 418, the UE may transmit MO uplink data using the uplink resource identified in the second communication. In this case, the UE may transmit the MO uplink data to BS1 and while in the idle mode, and BS1 may transmit or forward the MO uplink data to the UPF device.

In this way, the UE may receive the MT downlink data while in the idle mode, and without transitioning from the idle mode to a connected mode. This decreases the signaling overhead that is needed to transmit small amounts of MT downlink data to the UE and for the UE to transmit MO uplink data, which conserves networking, processing, and/or memory resources of the UE, the BS, and/or the other devices included in the wireless network. Moreover, this permits the UE to receive the MT downlink data and transmit the MO uplink data without establishing a connection (e.g., an RRC connection) with the BS, which decreases latency in receiving the MT downlink data and transmitting the MO uplink data. In addition, this reduces the quantity of repeated transitions from the idle mode to the connected mode to receive small amounts of MT downlink data that are transmitted in bursts, which may increase power saving of the UE.

As indicated above, FIG. 4 is provided as one or more examples. Other examples may differ from what is described with respect to FIG. 4.

Figure 5:
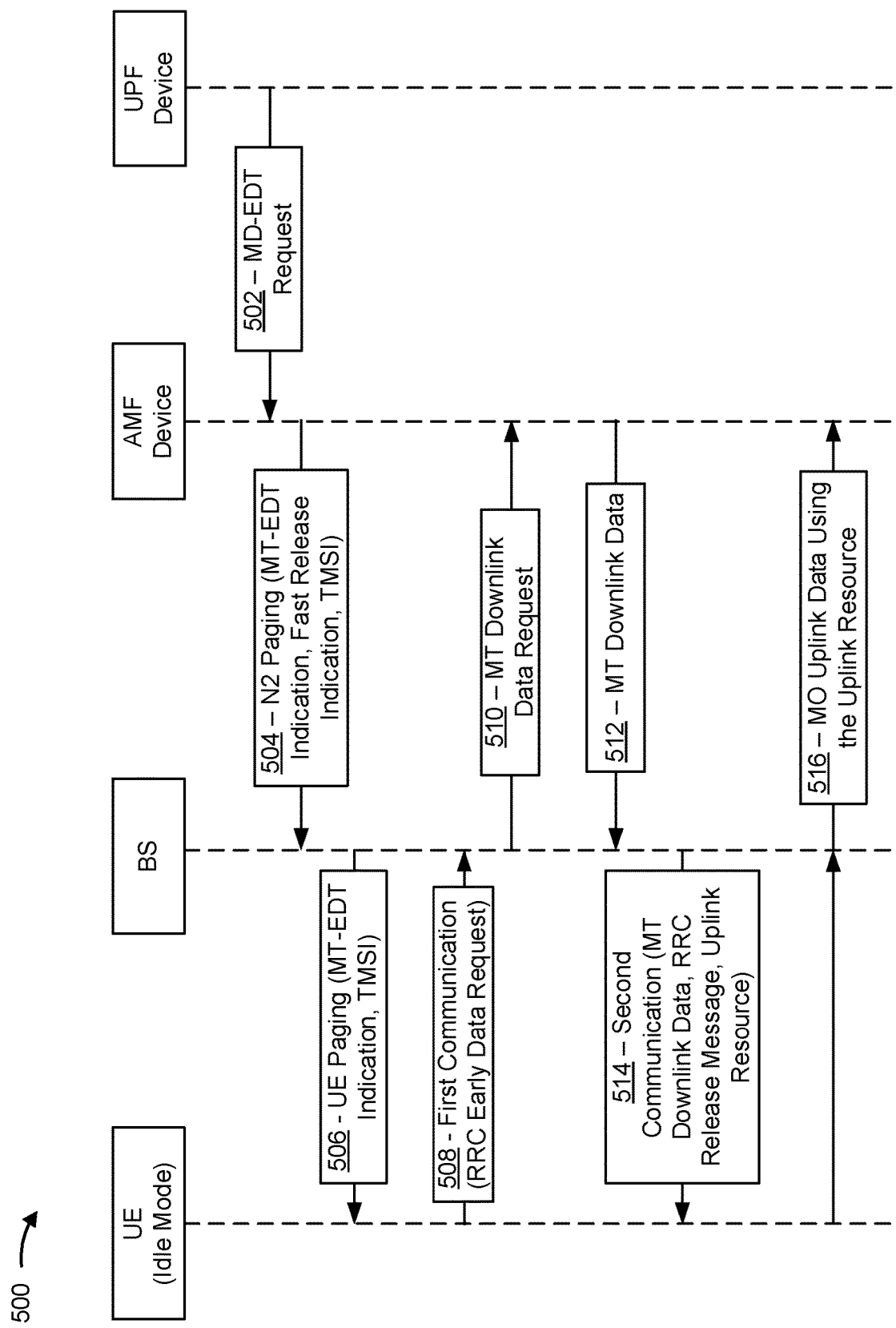

FIG. 5 is a diagram illustrating one or more examples 500 of mobile-terminated small data reception in an idle mode, in accordance with various aspects of the present disclosure. As shown in FIG. 5, example(s) 500 may include communication between various components of a wireless network (e.g., wireless network 100), such as a UE (e.g., UE 120), a BS (e.g., BS 110), a UPF device (e.g., network controller 130), an AMF device (e.g., network controller 130), and/or the like. In some aspects, the UE may operate in an idle mode.

As shown in FIG. 5, and by reference number 502, the UPF device may receive MT downlink data that is destined for the UE and may transmit an MT downlink request to the AMF device. The MT downlink data may include a small amount of data, such as data associated with a messaging application, location data, small multimedia files, push notifications, keep-alive packets, sensor data, and/or the like that originated from an application server, another UE, a BS, a network controller, and/or another device included in the wireless network or connected to another network.

In some aspects, the MT downlink data request may be a request to transmit the MT downlink data to the UE. In some aspects, the UPF device may transmit the MT downlink data request to the AMF device based at least in part on determining that the AMF device is associated with, and manages access and mobility for, a RAN in which the BS is included, based at least in part on determining that the UE is located in a cell of the BS, and/or the like.

As further shown in FIG. 5, and by reference number 504, the AMF device may transmit, to the BS, an N2 paging communication based at least in part on receiving the MT downlink data request from the UPF device. In some aspects, the AMF device may transmit the N2 paging communication to the BS based at least in part on determining that the UE is located in the cell of the BS, which may occur, for example, due to mobility of the UE after transitioning to the idle mode. In some aspects, the N2 paging communication may be a paging communication that is transmitted over a backhaul interface, such as an N2 interface and/or another type of backhaul interface.

In some aspects, the N2 paging communication may include an MT-EDT indication, a TMSI (e.g., an NG-S-TMSI and/or another type of TMSI) or another type of UE identifier associated with the UE, and a fast release indication. The MT-EDT indication may be an indication that the MT downlink data is being stored or buffered at the AMF device and is to be transmitted to the UE (e.g., the UE associated with the TMSI identified in the N2 paging communication).

The TMSI associated with the UE may be a UE identifier that is assigned to the UE for purposes of paging the UE while the UE is in the idle mode. In some aspects, the AMF device may generate the TMSI and assign the TMSI to the UE. In some aspects, the AMF device may generate the TMSI based at least in part on one or more parameters associated with the AMF device and/or the UE, such as an AMF pointer, an AMF set identifier, another identifier associated with the UE, and/or the like. The UE may provide the TMSI to the BS based at least in part on being paged by the BS (e.g., based at least in part on receiving a UE paging communication from the BS) in order to establish the identity of the UE with the BS.

The fast release indication may be an indication, to the BS, that the UE is to remain in the idle mode while receiving, and after receiving, the MT downlink data. In some aspects, the AMF device may determine to include the fast release indication in the N2 paging communication based at least in part on determining that the UE is expected to not transmit MO uplink data in response to the MT downlink data, or that the UE is expected to transmit a small amount of MO uplink data in response to the MT downlink data. In some aspects, the AMF device may determine that the UE is expected to not transmit MO uplink data in response to the MT downlink data, or that the UE is expected to transmit a small amount of MO uplink data in response to the MT downlink data, based at least in part on subscription information associated with the UE (e.g., subscription information for the wireless network, subscription information for one or more services provided by the wireless network or an application server, and/or the like), based at least in part on the data type of the MT downlink data, based at least in part on a historical traffic pattern associated with the UE, based at least in part on an indication from the UPF device and/or another network controller, and/or the like.

As further shown in FIG. 5, and by reference number 506, the BS may transmit a UE paging communication to the UE based at least in part on receiving the N2 paging communication that identifies the MT-EDT indication and the TMSI associated with the UE. In some aspects, the UE paging communication may include the MT-EDT indication and the TMSI associated with the UE.

The UE may receive the UE paging communication (e.g., while in the idle mode), and may descramble and/or decode the UE paging communication to determine whether the UE paging communication is directed to the UE. For example, the UE may determine that the UE paging communication is directed to the UE based at least in part on the UE paging communication identifying the TMSI associated with the UE.

As further shown in FIG. 5, and by reference number 508, the UE may initiate a RACH procedure with the BS, and may transmit a first communication as part of the RACH procedure. In some aspects, the UE may transmit the first communication based at least in part on identifying the MT-EDT indication in the UE paging communication. The first communication may include an RRCResumeRequest communication, an RRCSetupRequest communication, or another type of RACH communication to initiate connection establishment with the BS. In some aspects, the first communication may include an RRC early data request. The RRC early data request may be a request for the AMF device to transmit data to the UE.

As further shown in FIG. 5, and by reference number 510, the BS may receive the first communication and may transmit an MT downlink data request to the AMF device based at least in part on receiving the first communication. In some aspects, the MT downlink data request may be a request for the AMF device to transmit the MT downlink data, stored and/or buffered at the AMF device and destined for the UE, to the BS. In some aspects, the BS may transmit the MT downlink data request to the AMF device based at least in part on identifying RRC early data request from the UE. In some aspects, the MT downlink data request may be included in a non-access-stratum (NAS) packet data unit (PDU) request communication.

As further shown in FIG. 5, and by reference number 512, the AMF device may transmit the MT downlink data to the BS based at least in part on receiving the MT downlink data request from the BS. In some aspects, the MT downlink data may be included in one or more NAS PDUs.

As further shown in FIG. 5, and by reference number 514, the BS may transmit a second communication as part of the RACH procedure based at least in part on receiving the MT downlink data from the AMF device. The second communication may be a Msg2 communication or a Msg4 communication in a four-step RACH procedure, a MsgB communication in two-step RACH procedure, and/or the like.

In some aspects, the second communication may include the MT downlink data that is destined for the UE. Moreover, the second communication may include an RRC release message, which may cause the UE and the BS to terminate the RACH procedure such that the UE remains in the idle mode while the UE receives MT downlink data and after receiving the MT downlink data. In this case, the UE may identify the RRC release message included in the second communication, and may terminate the RACH procedure based at least in part on identifying the RRC release message to remain in the idle mode while receiving the MT downlink data and after receiving the MT downlink data. The RRC release message may be an RRCRelease communication, an RRCRelease with suspendConfig communication (e.g., which may cause the UE and/or the BS to store the UE context of the UE), and/or the like.

In some aspects, the second communication may further include an indication of an uplink resource, which may include a time-domain resource (e.g., one or more OFDM symbols, one or more slots, and/or the like) and/or a frequency-domain resource (e.g., one or more subcarriers, one or more component carriers, and/or the like) in which the UE may transmit MO uplink data (e.g., which may or may not be associated with the MT downlink data) while in the idle mode. In some aspects, the MT downlink data, the RRC release message, and the indication of the uplink resource may be multiplexed in the second communication (e.g., time division multiplexed and/or frequency division multiplexed).

As further shown in FIG. 5, and by reference number 516, the UE may transmit MO uplink data using the uplink resource identified in the second communication. In this case, the UE may transmit the MO uplink data to the BS and while in the idle mode, and the BS may transmit or forward the MO uplink data to the AMF device.

In this way, the UE may receive the MT downlink data while in the idle mode, and without transitioning from the idle mode to a connected mode. This decreases the signaling overhead that is needed to transmit small amounts of MT downlink data to the UE and for the UE to transmit MO uplink data, which conserves networking, processing, and/or memory resources of the UE, the BS, and/or the other devices included in the wireless network. Moreover, this permits the UE to receive the MT downlink data and transmit the MO uplink data without establishing a connection (e.g., an RRC connection) with the BS, which decreases latency in receiving the MT downlink data and transmitting the MO uplink data. In addition, this reduces the quantity of repeated transitions from the idle mode to the connected mode to receive small amounts of MT downlink data that are transmitted in bursts, which may increase power saving of the UE.

As indicated above, FIG. 5 is provided as one or more examples. Other examples may differ from what is described with respect to FIG. 5.

Figure 6:
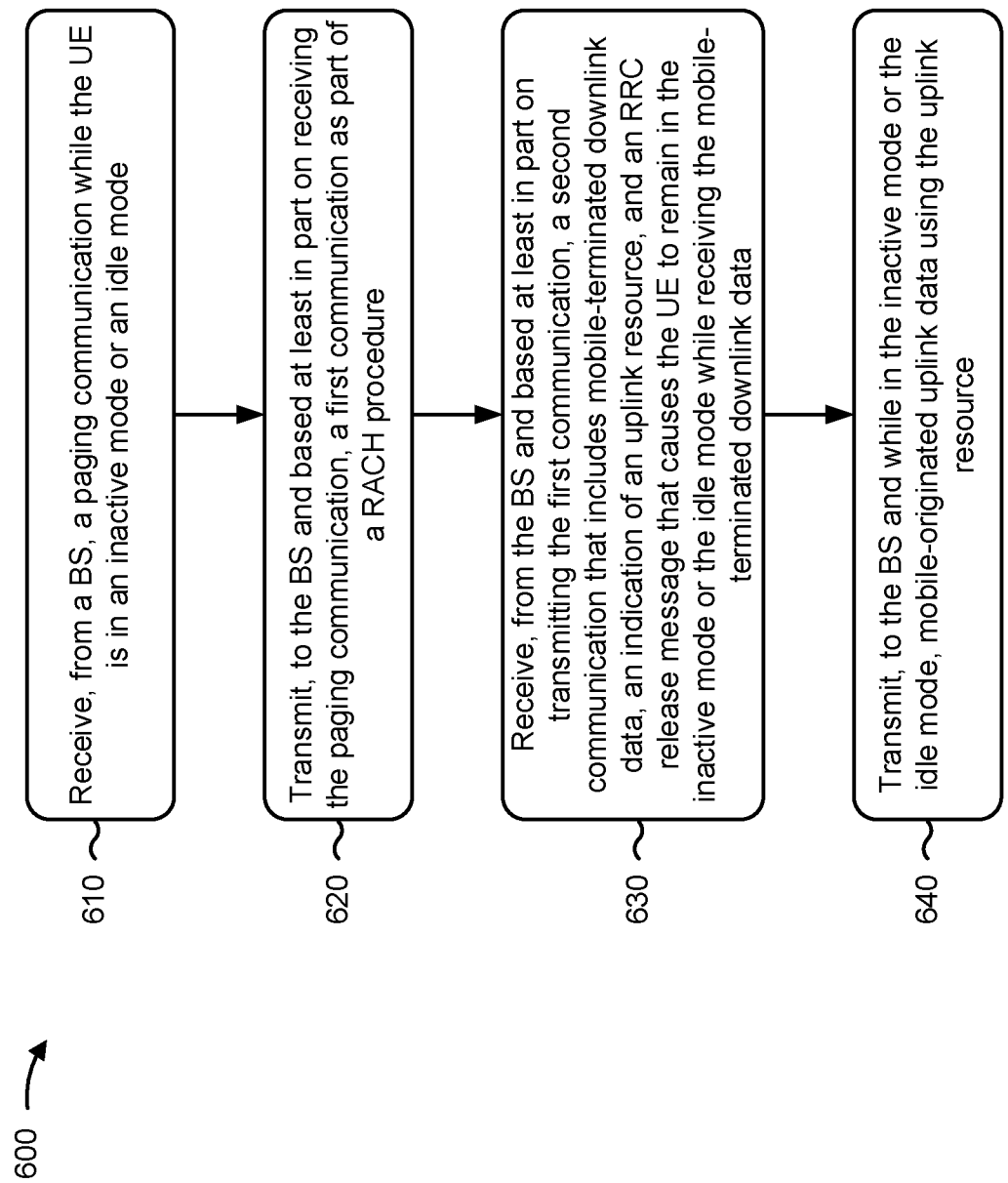
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with paging for mobile-terminated small data reception in idle and/or inactive mode.

As shown in FIG. 6, in some aspects, process 600 may include receiving, from a BS, a paging communication while the UE is in an inactive mode or an idle mode (block 610). For example, the UE (e.g., using receive processor 258, transmit processor 264, controller/processor 280, memory 282, and/or the like) may receive, from a BS, a paging communication while the UE is in an inactive mode or an idle mode, as described above.

As further shown in FIG. 6, in some aspects, process 600 may include transmitting, to the BS and based at least in part on receiving the paging communication, a first communication as part of a RACH procedure (block 620). For example, the UE (e.g., using receive processor 258, transmit processor 264, controller/processor 280, memory 282, and/or the like) may transmit, to the BS and based at least in part on receiving the paging communication, a first communication as part of a RACH procedure, as described above.

As further shown in FIG. 6, in some aspects, process 600 may include receiving, from the BS and based at least in part on transmitting the first communication, a second communication that includes mobile-terminated downlink data, an indication of an uplink resource, and an RRC release message that causes the UE to remain in the inactive mode or the idle mode while receiving the mobile-terminated downlink data (block 630). For example, the UE (e.g., using receive processor 258, transmit processor 264, controller/processor 280, memory 282, and/or the like) may receiving, from the BS and based at least in part on transmitting the first communication, a second communication that includes mobile-terminated downlink data, an indication of an uplink resource, and an RRC release message that causes the UE to remain in the inactive mode or the idle mode while receiving the mobile-terminated downlink data, as described above.

As further shown in FIG. 6, in some aspects, process 600 may include transmitting, to the BS and while in the inactive mode or the idle mode, mobile-originated uplink data using the uplink resource (block 640). For example, the UE (e.g., using receive processor 258, transmit processor 264, controller/processor 280, memory 282, and/or the like) may transmit, to the BS and while in the inactive mode or the idle mode, mobile-originated uplink data using the uplink resource, as described above.

Process 600 may include additional aspects, such as any single aspect or any combination of aspects described below and/or in connection with one or more other processes described elsewhere herein.

In a first aspect, the first communication is an RRC resume request or an RRC early data request, and the second communication comprises a Msg2 communication, a Msg4 communication, or a MsgB communication. In a second aspect, alone or in combination with the first aspect, the RACH procedure is a two-step RACH procedure or a four-step RACH procedure. In a third aspect, alone or in combination with one or more of the first or second aspects, the mobile-terminated downlink data and the RRC release message are multiplexed in the second communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
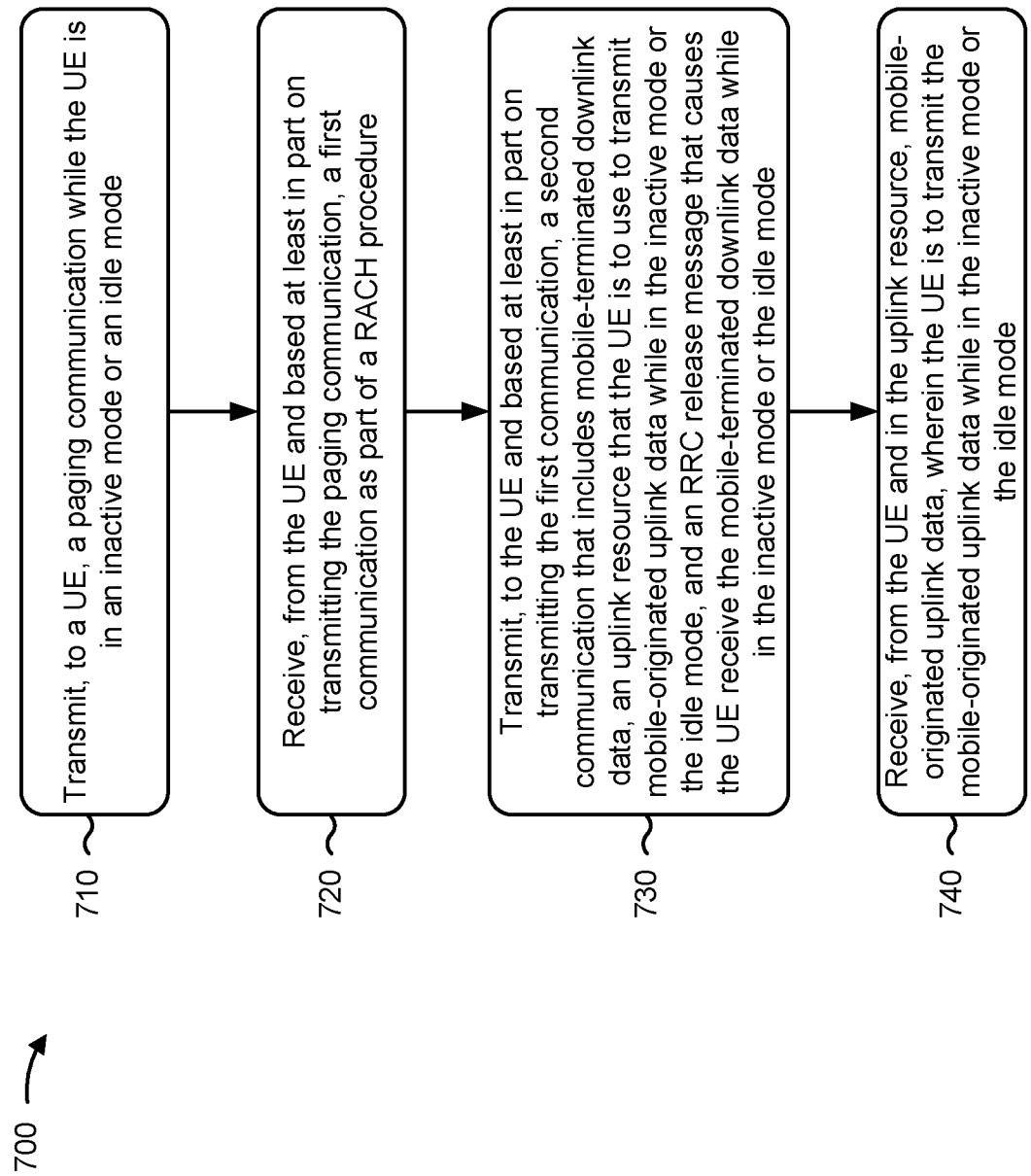
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with paging for mobile-terminated small data reception in idle and/or inactive mode.

As shown in FIG. 7, in some aspects, process 700 may include transmitting, to a UE, a paging communication while the UE is in an inactive mode or an idle mode (block 710). For example, the BS (e.g., using transmit processor 220, receive processor 238, controller/processor 240, memory 242, and/or the like) may transmit, to a UE, a paging communication while the UE is in an inactive mode or an idle mode, as described above.

As further shown in FIG. 7, in some aspects, process 700 may include receiving, from the UE and based at least in part on transmitting the paging communication, a first communication as part of a RACH procedure (block 720). For example, the BS (e.g., using transmit processor 220, receive processor 238, controller/processor 240, memory 242, and/or the like) may receive, from the UE and based at least in part on transmitting the paging communication, a first communication as part of a RACH procedure, as described above.

As further shown in FIG. 7, in some aspects, process 700 may include transmitting, to the UE and based at least in part on transmitting the first communication, a second communication that includes mobile-terminated downlink data, an uplink resource that the UE is to use to transmit mobile-originated uplink data while in the inactive mode or the idle mode, and an RRC release message that causes the UE receive the mobile-terminated downlink data while in the inactive mode or the idle mode (block 730). For example, the BS (e.g., using transmit processor 220, receive processor 238, controller/processor 240, memory 242, and/or the like) may transmit, to the UE and based at least in part on transmitting the first communication, a second communication that includes mobile-terminated downlink data, an uplink resource that the UE is to use to transmit mobile-originated uplink data while in the inactive mode or the idle mode, and an RRC release message that causes the UE receive the mobile-terminated downlink data while in the inactive mode or the idle mode, as described above.

As further shown in FIG. 7, in some aspects, process 700 may include receiving, from the UE and in the uplink resource, mobile-originated uplink data, wherein the UE is to transmit the mobile-originated uplink data while in the inactive mode or the idle mode (block 740). For example, the BS (e.g., using transmit processor 220, receive processor 238, controller/processor 240, memory 242, and/or the like) may receive, from the UE and in the uplink resource, mobile-originated uplink data, as described above. In some aspects, the UE is to transmit the mobile-originated uplink data while in the inactive mode or the idle mode.

Process 700 may include additional aspects, such as any single aspect or any combination of aspects described below and/or in connection with one or more other processes described elsewhere herein.

In a first aspect, transmitting the second communication that includes the RRC release message comprises transmitting the second communication that includes the RRC release message based at least in part on receiving a fast release indication for the UE. In a second aspect, alone or in combination with the first aspect, process 700 further comprises receiving the fast release indication in an N2 paging communication from a network controller, or receiving the fast release indication in a RAN paging communication from another BS.

In a third aspect, alone or in combination with one or more of the first and second aspects, transmitting the second communication that includes the mobile-terminated downlink data comprises transmitting the second communication that includes the mobile-terminated downlink data based at least in part on receiving the mobile-terminated downlink data. In a fourth aspect, alone or in combination with one or more of the first through third aspects, process 700 further comprises receiving the mobile-terminated downlink data from a network controller, or receiving the mobile-terminated downlink data from another BS.

In a fifth aspect, alone or in combination with one or more of the first through fourth aspects, process 700 further comprises transmitting the mobile-originated uplink data to at least one of another BS or a network controller.

In a sixth aspect, alone or in combination with one or more of the first through fifth aspects, the first communication is an RRC resume request or an RRC early data request, and the second communication comprises a Msg2 communication, a Msg4 communication, or a MsgB communication. In a seventh aspect, alone or in combination with one or more of the first through sixth aspects, the RACH procedure is a two-step RACH procedure or a four-step RACH procedure. In an eighth aspect, alone or in combination with one or more of the first through seventh aspects, the mobile-terminated downlink data and the RRC release message are multiplexed in the second communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station (BS), a paging communication while the UE is in an inactive mode or an idle mode;
   transmitting, to the BS and based at least in part on receiving the paging communication, a first communication as part of a random access channel (RACH) procedure;
   receiving, from the BS and based at least in part on transmitting the first communication, a second communication, comprising a random access message, that includes:
      small mobile-terminated downlink data,
      an indication of an uplink resource, and
      a radio resource control (RRC) release message that causes the UE to remain in the inactive mode or the idle mode while receiving the small mobile-terminated downlink data; and
   transmitting, to the BS and while in the inactive mode or the idle mode, mobile-originated uplink data using the uplink resource.

2. The method of claim 1, wherein the first communication is an RRC resume request or an RRC early data request; and
   wherein the second communication comprises:
      a Msg2 communication,
      a Msg4 communication, or
      a MsgB communication.

3. The method of claim 1, wherein the RACH procedure is a two-step RACH procedure or a four-step RACH procedure.

4. The method of claim 1, wherein the small mobile-terminated downlink data and the RRC release message are in the second communication.

5. A method of wireless communication performed by a base station (BS), comprising:
- transmitting, to a user equipment (UE), a paging communication while the UE is in an inactive mode or an idle mode;
- receiving, from the UE and based at least in part on transmitting the paging communication, a first communication as part of a random access channel (RACH) procedure;
- transmitting, to the UE and based at least in part on transmitting the first communication, a second communication that includes:
  - small mobile-terminated downlink data,
  - an uplink resource that the UE is to use to transmit mobile-originated uplink data while in the inactive mode or the idle mode, and
  - a radio resource control (RRC) release message that causes the UE receive the small mobile-terminated downlink data while in the inactive mode or the idle mode; and receiving, from the UE and in the uplink resource, mobile-originated uplink data,
- wherein the UE is to transmit the mobile-originated uplink data while in the inactive mode or the idle mode.

6. The method of claim 5, wherein transmitting the second communication that includes the RRC release message comprises:
- transmitting the second communication that includes the RRC release message based at least in part on receiving a fast release indication for the UE.

7. The method of claim 6, further comprising:
- receiving the fast release indication in an N2 paging communication from a network controller, or
- receiving the fast release indication in a radio access network (RAN) paging communication from another BS.

8. The method of claim 5, wherein transmitting the second communication that includes the small mobile-terminated downlink data comprises:
- transmitting the second communication that includes the small mobile-terminated downlink data based at least in part on receiving the small mobile-terminated downlink data.

9. The method of claim 8, further comprising:
- receiving the small mobile-terminated downlink data from a network controller, or
- receiving the small mobile-terminated downlink data from another BS.

10. The method of claim 5, further comprising:
- transmitting the mobile-originated uplink data to at least one of:
  - another BS, or
  - a network controller.

11. The method of claim 5, wherein the first communication is an RRC resume request or an RRC early data request; and
- wherein the second communication comprises:
  - a Msg2 communication,
  - a Msg4 communication, or
  - a MsgB communication.

12. The method of claim 5, wherein the RACH procedure is a two-step RACH procedure or a four-step RACH procedure.

13. The method of claim 5, wherein the small mobile-terminated downlink data and the RRC release message are in the second communication.

14. A user equipment (UE) for wireless communication, comprising:
- a memory; and
- one or more processors coupled to the memory, the memory and the one or more processors configured to:
  - receive, from a base station (BS), a paging communication while the UE is in an inactive mode or an idle mode;
  - transmit, to the BS and based at least in part on receiving the paging communication, a first communication as part of a random access channel (RACH) procedure; and
  - receive, from the BS and based at least in part on transmitting the first communication, a second communication that includes:
    - small mobile-terminated downlink data,
    - an indication of an uplink resource, and
    - a radio resource control (RRC) release message that causes the UE to remain in the inactive mode or the idle mode while receiving the small mobile-terminated downlink data; and
  - transmit, to the BS and while in the inactive mode or the idle mode, mobile-originated uplink data using the uplink resource.

15. The UE of claim 14, wherein the first communication is an RRC resume request or an RRC early data request.

16. The UE of claim 15, wherein the second communication comprises:
- a Msg2 communication,
- a Msg4 communication, or
- a MsgB communication.

17. The UE of claim 14, wherein the RACH procedure is a two-step RACH procedure.

18. The UE of claim 14, wherein the RACH procedure is a four-step RACH procedure.

19. The UE of claim 14, wherein the small mobile-terminated downlink data and the RRC release message are in the second communication.

20. A base station (BS) for wireless communication, comprising:
- a memory; and
- one or more processors coupled to the memory, the memory and the one or more processors configured to:
  - transmit, to a user equipment (UE), a paging communication while the UE is in an inactive mode or an idle mode;
  - receive, from the UE and based at least in part on transmitting the paging communication, a first communication as part of a random access channel (RACH) procedure; and
  - transmit, to the UE and based at least in part on transmitting the first communication, a second communication that includes:
    - small mobile-terminated downlink data,
    - an uplink resource that the UE is to use to transmit mobile-originated uplink data while in the inactive mode or the idle mode, and
    - a radio resource control (RRC) release message that causes the UE receive the small mobile-terminated downlink data while in the inactive mode or the idle mode; and
  - receive, from the UE and in the uplink resource, mobile-originated uplink data, wherein the UE is to transmit the mobile-originated uplink data while in the inactive mode or the idle mode.

21. The BS of claim 20, wherein the one or more processors, to transmit the second communication that includes the RRC release message, are configured to:
  transmit the second communication that includes the RRC release message based at least in part on receiving a fast release indication for the UE.

22. The BS of claim 21, wherein the one or more processors are further configured to:
  receive the fast release indication in an N2 paging communication from a network controller.

23. The BS of claim 21, wherein the one or more processors are further configured to:
  receive the fast release indication in a radio access network (RAN) paging communication from another BS.

24. The BS of claim 20, wherein the one or more processors, to transmit the second communication that includes the small mobile-terminated downlink data, are configured to:
  transmit the second communication that includes the small mobile-terminated downlink data based at least in part on receiving the small mobile-terminated downlink data.

25. The BS of claim 24, wherein the one or more processors are further configured to:
  receive the small mobile-terminated downlink data from a network controller, or
  receive the small mobile-terminated downlink data from another BS.

26. The BS of claim 20, wherein the one or more processors are further configured to:
  transmit the mobile-originated uplink data to at least one of:
    another BS, or
    a network controller.

27. The BS of claim 20, wherein the first communication is an RRC resume request or an RRC early data request; and
  wherein the second communication comprises:
    a Msg2 communication,
    a Msg4 communication, or
    a MsgB communication.

28. The BS of claim 20, wherein the RACH procedure is a two-step RACH procedure or a four-step RACH procedure.

29. The BS of claim 20, wherein the small mobile-terminated downlink data and the RRC release message are multiplexed in the second communication.

30. A non-transitory computer-readable medium storing one or more instructions for wireless communication, the one or more instructions comprising:
  one or more instructions that, when executed by one or more processors of a user equipment (UE), cause the one or more processors to:
    receive, from a base station (BS), a paging communication while the UE is in an inactive mode or an idle mode;
    transmit, to the BS and based at least in part on receiving the paging communication, a first communication as part of a random access channel (RACH) procedure; and
    receive, from the BS and based at least in part on transmitting the first communication, a second communication that includes:
      small mobile-terminated downlink data,
      an indication of an uplink resource, and
      a radio resource control (RRC) release message that causes the UE to remain in the inactive mode or the idle mode while receiving the small mobile-terminated downlink data; and
    transmit, to the BS and while in the inactive mode or the idle mode, mobile-originated uplink data using the uplink resource.

31. The non-transitory computer-readable medium of claim 30, wherein the first communication is an RRC resume request or an RRC early data request.

32. The non-transitory computer-readable medium of claim 31, wherein the second communication comprises:
  a Msg2 communication,
  a Msg4 communication, or
  a MsgB communication.

33. The non-transitory computer-readable medium of claim 30, wherein the RACH procedure is a two-step RACH procedure.

34. The non-transitory computer-readable medium of claim 30, wherein the RACH procedure is a four-step RACH procedure.

35. The non-transitory computer-readable medium of claim 30, wherein the small mobile-terminated downlink data and the RRC release message are multiplexed in the second communication.

* * * * *